(12) United States Patent
Verma et al.

(10) Patent No.: US 10,911,916 B2
(45) Date of Patent: Feb. 2, 2021

(54) INTEGRATED SMART ELECTRONICS REGISTRATION PLATE SYSTEM FOR MOTOR VEHICLES

(71) Applicants: Shiv Prakash Verma, Cedar Knolls, NJ (US); Chandra Shekhar Khare, Bhopal (IN)

(72) Inventors: Shiv Prakash Verma, Cedar Knolls, NJ (US); Chandra Shekhar Khare, Bhopal (IN)

(*) Notice: Subject to any disclaimer, the term of this patent is extended or adjusted under 35 U.S.C. 154(b) by 0 days.

(21) Appl. No.: 15/831,350

(22) Filed: Dec. 4, 2017

(65) Prior Publication Data

US 2019/0174279 A1    Jun. 6, 2019

(51) Int. Cl.

| | |
|---|---|
| *G08G 1/01* | (2006.01) |
| *H04W 4/44* | (2018.01) |
| *H04W 4/029* | (2018.01) |
| *G07B 15/06* | (2011.01) |
| *B60R 13/10* | (2006.01) |
| *G06Q 50/26* | (2012.01) |
| *G08B 13/06* | (2006.01) |

(52) U.S. Cl.
CPC ............... *H04W 4/44* (2018.02); *B60R 13/10* (2013.01); *G06Q 50/26* (2013.01); *G07B 15/063* (2013.01); *G08B 13/06* (2013.01); *H04W 4/029* (2018.02)

(58) Field of Classification Search
CPC ........ H04W 4/44; H04W 4/029; B60R 13/10; G06Q 50/26; G07B 15/063; G08B 13/06
USPC ......................................................... 340/933
See application file for complete search history.

(56) References Cited

U.S. PATENT DOCUMENTS

| | | | |
|---|---|---|---|
| 8,914,196 B1* | 12/2014 | Breed | B60R 21/0132 701/45 |
| 2002/0195490 A1* | 12/2002 | Gehlot | B60R 13/10 235/384 |
| 2006/0028556 A1* | 2/2006 | Bunn | G10L 15/25 348/211.99 |
| 2008/0170982 A1* | 7/2008 | Zhang | B29C 48/0019 423/447.3 |

(Continued)

*Primary Examiner* — Zhen Y Wu

(57) ABSTRACT

An integrated Web Server based vehicle management system, with Smart Electronics Registration Plate or a Smart Electronics License Plate for e-governance in Department of Motor Vehicles, law enforcement, emergency medical care, toll collection, vehicle theft detection, vehicle accident monitoring, vehicle plate and power tampering, and vehicle hijacking prevention, and 'Amber' alerts assistance. The Smart Electronics Registration plate uses Electrophoretic reflective display known as Electronic Ink, E-Ink, e-paper, CLEARink, requiring no power to maintain display, and conforms to present day Registration Plate or License Plate form and size with added features. System supports a smartphone based App with map to enable all the above functions to assist drivers, DMV, Police, and ER personnel. The Smart Electronics Registration Plates communicates with Web Server using personal Hotspot feature of a smartphone over Bluetooth or Wi-fi and has built in smarts for accident detection, vehicle motion detection, GPS, and plate tamper. Registration Plate uses a built in cellular modem for communication in case of no personal Hotspot in the vehicle or in crowd running system App. All the communications are secure and interaction with Web Server uses at least triple authentication.

17 Claims, 10 Drawing Sheets

(56) References Cited

U.S. PATENT DOCUMENTS

| | | | | |
|---|---|---|---|---|
| 2012/0073168 A1* | 3/2012 | Rogero | ............... | B60R 13/105 |
| | | | | 40/205 |
| 2015/0206357 A1* | 7/2015 | Chen | ................. | G06F 16/2425 |
| | | | | 701/31.4 |
| 2015/0353031 A1* | 12/2015 | Cairo | .................. | B60R 13/105 |
| | | | | 340/425.5 |
| 2016/0039364 A1* | 2/2016 | Findlay | ................. | G01S 19/14 |
| | | | | 340/468 |
| 2016/0093122 A1* | 3/2016 | Chen | .................. | G07C 5/0808 |
| | | | | 701/29.6 |
| 2016/0210267 A1* | 7/2016 | Imana | .................. | G06F 3/1423 |
| 2016/0311365 A1* | 10/2016 | Hankerson | ............. | B60Q 1/56 |
| 2017/0046929 A1* | 2/2017 | Strom | .................... | H04L 67/42 |
| 2018/0154867 A1* | 6/2018 | Golduber | .............. | G07B 15/00 |
| 2018/0336537 A1* | 11/2018 | Maenpaa | ............. | G06Q 20/102 |
| 2019/0062153 A1* | 2/2019 | Tseng | .................... | B81B 3/001 |

\* cited by examiner

INTEGRATED SMART ELECTRONICS REGISTRATION PLATE SYSTEM FOR MOTOR VEHICLES

BACKGROUND OF THE INVENTION

1. Field of Invention

The present invention refers to Web Server based system with an integrated Smart Electronics Registration Plate, iSerp. The vehicle Registration Plate, iSerp, uses Bluetooth, Wi-fi and cellular networks to communicate with the iSerp Web Server. It also uses a smartphone based application to communicate with the server, Registration Plate, vehicle registration, and authorized agencies operators. The Registration Plate in the invention requires no power to continuously display information and all the information on the plate is visible in bright sunlight and night. The Invention allows location based services to pin point location of a vehicle, detect vehicle theft, promote advertisement and display commercial information, allows Toll Collection, Truck Load Monitoring, detect vehicle accident and communicate with medical/ER agency. All these communications are accomplished over a secured link. The Registration Plate display is rugged and can withstand vandalism, and fully tamper proof. System allows cashless transactions for all applications and services. All the users of the server require a special App running in the smartphones. A triple authentication method is used before they can exchange any information from the Server and uses a highly secured communication link.

The present invention is applicable to all vehicle types and boats which requires registration plate.

2. Description of Prior Art

A lot of transformation has taken place on the automobiles and transportation industries in last one hundred years. e.g. Hybrid and all Electric vehicles, autonomous semiautonomous vehicles, tag driven toll gates on the highways. However there is not much innovation happened in the Registration Plate for vehicles. We have only moved from wooden plates to aluminum stamped plates in last one hundred years.

Automobile and vehicle thefts have been rising around the world where thieves steal the vehicles and sell them in different states, countries or chop them to resell them as parts. Insurance companies pay billions of dollars annually for stolen vehicles, and it is also driving cost of insurance to the owners. And this creates extra work load on the Department Motor Vehicles (DMV) and police agencies globally.

Criminals use stolen Registration Plate to install them on stolen vehicles to ship contraband goods across the countries or commit crimes and cause unnecessary aggravation to the Registration Plate owners, law enforcement agencies and insurance companies.

Thousands of trucks and lorries with goods worth millions of dollars are stolen and hijacked by criminals. This again incurs billions of dollars of loss to trucking industries and insurance companies every where in the world.

Private vehicles are hijacked by criminals causing physical and emotional harm to the innocent drivers. In many countries where Govt. and private run transport passenger services do not follow licensed routes, posted speeds, and get into accidents with no way to find out.

Automobiles and trucks get in an accident every day causing serious bodily harm to passengers and emergency response (ER) personnel cannot get them proper medical attention on time.

Terrorists, criminals and police on high speed chase cause human and material damages without ability to stop them.

We see all along the highway 'Amber' alerts displaying the vehicle Registration Plate number but no way to identify the vehicle.

The transformation in the taxi industry e.g. Uber, and host of others have put millions of cars on the roads with lot of commercial potential for dissemination of current news information, paid advertisements and traffic related information.

U.S. Pat. No. 0,189,493 by Estus et al. uses a radio frequency electronics with a standard license plate in conjunction with road side mounted receivers and information system to track approximate location to report violations to authorities with law enforcement. It uses a rf transceiver with LED display signal mounted on a standard license plate. This invention does not work if the vehicle is on the road with no road side mounted receivers.

U.S. Pat. No. 0,078,933 A1 describes an electronic Registration Plate and information processing system. It uses a LED matrix display with backup photovoltaic panel and an internal battery. The Registration Plate does not conform to standard plate and requires elaborate mounting procedure. LED matrix displays are power consuming and will be a big drain on the vehicle battery when it is not running. The backup photovoltaic panel is not very efficient and requires direct sunlight. The shadow cast by LED matrix display, opaque backlighting in LCD, and vertical mounting of the plate will make it further inefficient. It may not be sufficient to charge the battery to operate the plate when vehicle is not running. The plate assembly mounting is different that the present standard practice. Heavy weight and fragility of LED matrix or LCD display would make the plate shatter and inoperable by vandal, or vehicle thief without generating any alerts and thus defeating the purpose of whole system. And system do not solve today's issue highlighted in the beginning and adds more burden on the DMV and police agency.

SUMMARY OF INVENTION

Figure 1:
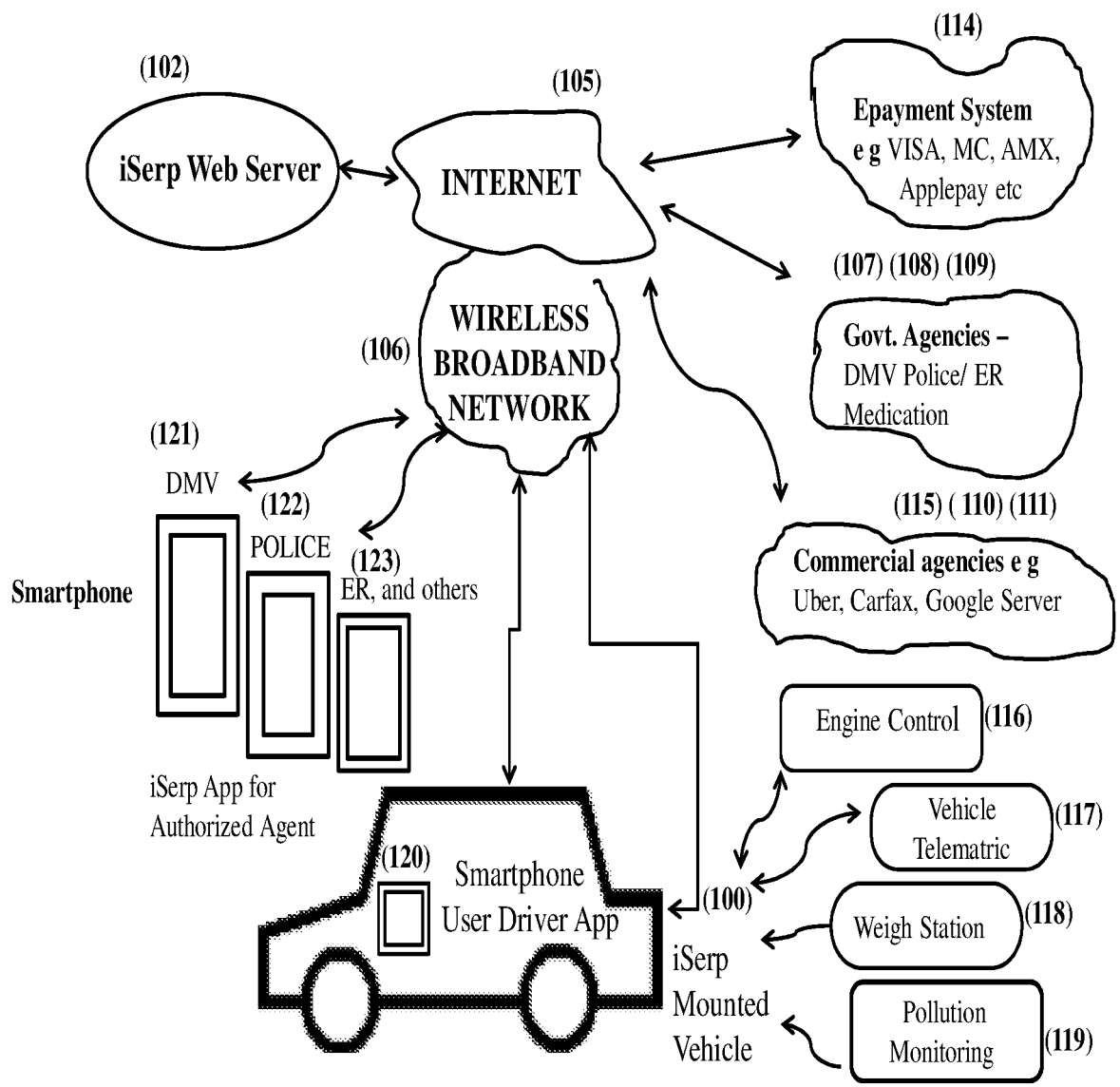
FIG. 1 is a block diagram of an integrated Smart Electronic Registration Plate, iSerp, System.

The general objective of this invention is to provide Web Server based System with ability to securely communicate with an integrated Smart Electronic Registration Plate, iSerp, mounted on a vehicle. In this invention the system solves all the issues outlines in the background of the invention and allows vehicle registration plates to leap frog in the 21st century.

The Web Server in the invention can communicate with Department of Motor Vehicle (DMV), Police Agencies, Emergency Server, Insurance Companies, Medical Servers, and e-Payment Systems and Toll Collection Servers. The Server can communicate with these entities over a secured link to provide/collect information on the vehicle and, its operators, and other passengers related Services.

In the invention, the server uses a smartphone App to allow registered vehicle users to operate the vehicle, DMV and other agencies to access data from the server and download the vehicle related data into the smart Registration Plate to store and display. The system alert is generated in case of accident and accident location, with accident scene pictures displayed on the smartphone, and information related to driver and other passengers' medical history is send to ER team.

The smartphone App also allows the rightful owner and govt. agencies to get alert in case of someone tampers the Registration Plate or attempts to steal the vehicle. The invention allows other applications like e-Payment for cashless driving through tolls, payment to travel on commercial coaches. They are implemented with the smartphone App running on the system server, In this invention, the system allows monitoring of Commercial Vehicles, detect their conforming to pollution controls, travelling on the scheduled route, load capacity, and criminal hijackings.

The integrated Smart Electronic Registration Plate, iSerp, uses Electrophoretic or E-ink as display. These bi-stable reflective displays require no power to maintain the display and can be viewed in bright daylight. The Registration Plate is very rugged, and can withstand crash and bullets. In this invention the iSerp allows DMV agencies around the world to maintain same physical and graphic look, and mounting methods practiced around the world, while offering all smart features including tampering of plate, removal of vehicle battery power, and identifying vehicles wanted under 'Amber' alert.

In this invention the iSerp plate uses a thin plastic-like transparent sheet coated with organic molecules to convert ultraviolent and near infrared wavelengths energy into electricity to charge the backup battery. This allows the battery of iSerp Plate to be charged in the enclosed areas. This sheet also acts like a protector cover for the display.

In this invention, five types of integrated smart registration plates are described. The first one, uses E-ink based alpha numeric characters to display vehicle Registration Plate number, registration validity, inspection validity, insurance validity. The second version of basic Registration Plate is with rolling Alpha Numeric display for commercial advertisement as a part of the plate.

The third version of Registration Plate uses a separate rolling Alpha Numeric display attached to the plate.

The fourth version is a fully graphic display external to the basic registration plate.

The fifth version of the Registration Plate is fully graphic E-ink display for the Registration Plate and external attached display for other commercial uses.

The iSerp has a microprocessor with FLASH and RAM memory, Bluetooth, rf-id, cellular, wi-fi transceivers for communication, GPS for location, accident and acceleration detection logic, with camera and a display driver to control displays. All the Electronics is powered by Vehicle battery, and a backup battery is integrated part of the plate.

The iSerp plate can communicate with iSerp Web Server via Wi-fi, Bluetooth and Cellular networks. The iSerp plate can also communicate with the server via Bluetooth or wi-fi using Hotspot mode found in the smartphone and also in the crowd mode of smartphones running iSerp application.

The iSerp Registration plate can communicate with on board vehicle telematic, Weigh Station electronics using Bluetooth.

iSerp applies to all vehicles—(two wheels or more), boats etc—needing a registration plate.

DETAILED DESCRIPTION OF THE INVENTION

In this invention as shown in FIG. 1 a management system for a Smart Electronic Vehicle Registration Plate, iSerp is described. The iSerp, Registration plate makes use of Electrophoretic reflective display known as e-paper, Electric Ink, E-ink, CLEARink. This bi-stable reflective display is very rugged, require no power to maintain display and can be viewed in bright sunlight. And thus offers a distinct advantage with any other previously proposed inventions. The license plate (100) has all the smarts like GPS, plate tamper detection, vehicle battery tamper, acceleration detection, digital camera, Bluetooth, Wi-fi, Cellular modem, display controller and a microcomputer with FLASH and RAM memory. The iSerp plate (100) communicates with the iSerp system Web Server (102) over the wireless broadband (105), Bluetooth and Wi-fi using a secured communication link.

The iSerp Server (102) is used to download the Registration Plate information from the Department of Motor Vehicle such as owner, vehicle model make, color and year, VIN number, address and country. This information is stored in the smart plate, iSerp (100). It is envisioned in this invention that method of interacting with the DMV, Police, ER services and other may vary state to state. The invention can be used on any moving vehicle like two, three and four wheelers, boats. The iSerp (100) stores and display the vehicle inspection date, registration date and insurance expiry dates. It can store and display any other information deemed by the govt. agencies. The Web Server (102) will send message to iSerp (100) for display if any of these dates expire and owner has not renewed.

Tampering with plate mounting, removal of battery power would initiate a sound alert in the vehicle and an alert message is sent by the iSerp (100) to the Web Server (102). The Web Server (102) would initiate messages to the registered users of the vehicle, DMV (107)(121), Police agency (108)(122) and send a command to iSerp (100) to display "TAMPER" on the iSerp. The rightful vehicle owner can initiate a message to Web Server (102) if the alert is accidental and the Web Server would send 'reset' command to the iSerp to display the Registration Plate number and cancel the alert command to DMV (107)(121) and Police (108)(122). All the command initiated by the iSerp (100) includes GPS coordinate of the iSerp (100), which is used by the Web Server (102) to locate the position of the Vehicle, where the alert is initiated. This position is also transmitted to the govt. agency (108)(122). The Web Server (102) uses digital map offered by Google Maps or any other digital map service provider.

The iSerp System in the invention interacts with users with iSerp application (App) running on a smartphone. The system in the invention will support Apple IOS, Google ANDROID and other prevailing smartphone operating systems. The smartphone App in the invention is digital map based.

In the invention a registered vehicle owner is asked to register with the Web Server (102) using iSerp App (120). The iSerp App requires vehicle owner to input vehicle Registration Plate number, driver license number, name of authorized operators, age, medical information and mobile contact information. Each authorized user of the vehicle can use own account on the iSerp Web Server (102). This smartphone App (120) in the invention is used by the iSerp system to prevent vehicle theft, provides operator information in case of an accident, and other applications. The Web Server (102) uses mobile phone number with one time password (OTP) to validate each user. The iSerp App uses triple authentication for any authorized user to access the information from Web Server (102).

Figure 2:
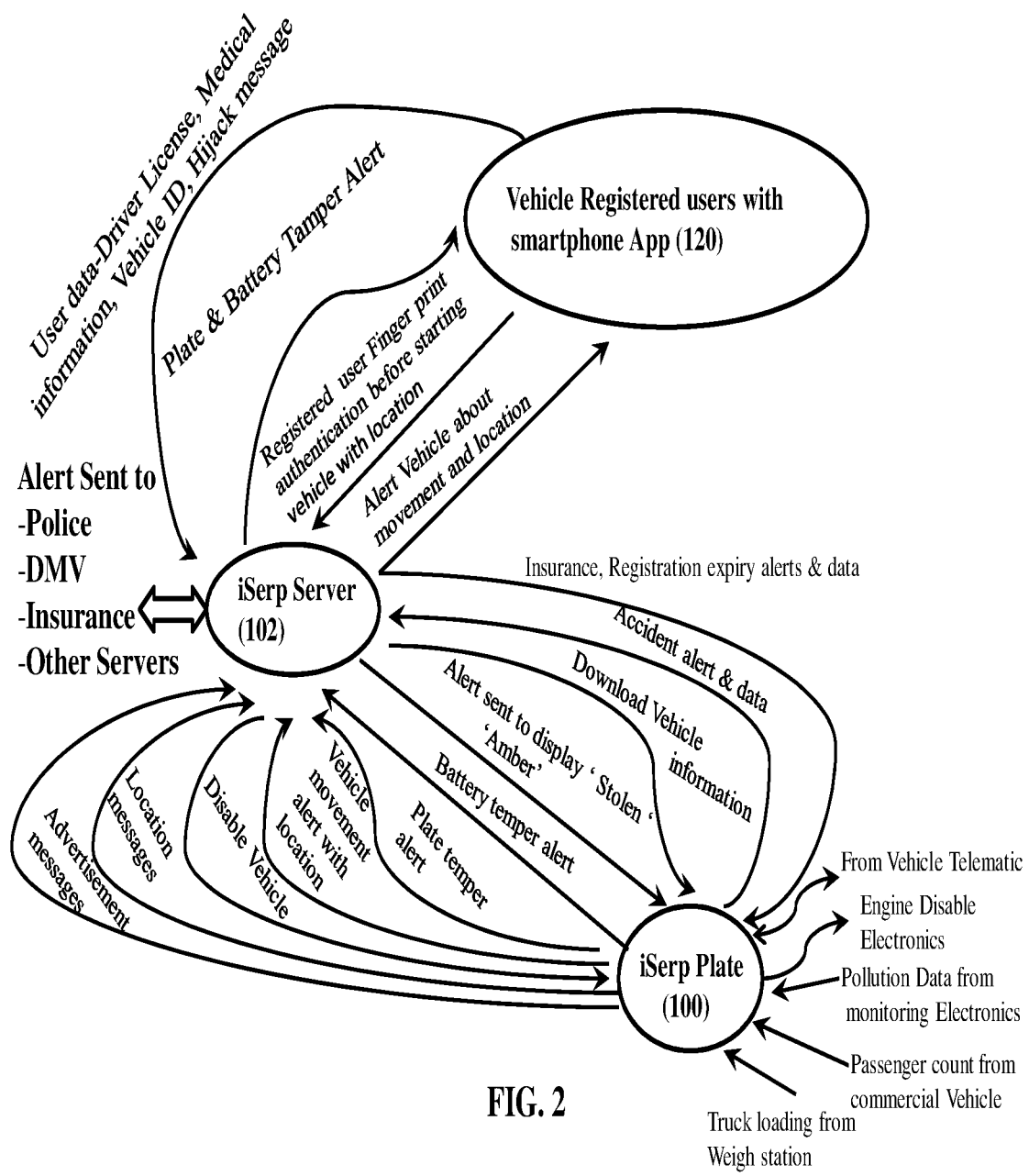
FIG. 2 iSerp System messages and Data Flow Diagram
FIG. 3 iSerp Plate Assembly Diagram
FIG. 4 iSerp Electronics Block Diagram
FIG. 5 iSerp Plate Tamper Logic and Ambient Sensor
FIG. 6 a basic Registration Plate
FIG. 7 Basic Registration Plate with Alpha-Numeric Display and a Rolling Alpha Numeric for advertisement.

FIG. 2 of the invention shows command messages and data transmitted between the iSerp (100), vehicle user (120), and Web Server (102) during various operational modes of the vehicle. The invention assumes the owner of the vehicle has registered the vehicle with DMV (107) and the iSerp (100) has been downloaded with all the information. And the iSerp plate (100) has been activated by the iSerp server (102). The logistics of above may vary with each state and is not relevant to the invention. And it is assumed that the owner has downloaded iSerp App on smartphone and activated it using triple authentication i.e. finger print, password, and one time password sent to the user's smartphone.

In this invention, authorized user uses iSerp App (120) and finger print authentication to send an alert from the vehicle to iSerp server (102). User App will send GPS coordinate of his smartphone (120) to the server (102) as driver starts the vehicle. The vehicle movement is detected by the iSerp (100) and it sends alert to the server (102) indicating movement and GPS coordinate of the iSerp plate (100). The server (102) compares the two coordinates/locations to verify movement of the vehicle by the authorized user. In case an authorized user moves the vehicle without signing into App (120), the iSerp server (102) will send alert message to all authorized users upon getting message from iSerp plate (100) about the location and movement of the vehicle. If this alert is not answered by authorized users, than server (102) decides the vehicle has been moved illegally and the server (102) will inform police and other agencies about the vehicle theft in process on their Apps (122). And also inform the movement of the stolen vehicle with Registration number on smartphone App of the users (120) and police (122)(108) to catch the criminal. Web Server (102) also sends a command to iSerp (100) to display 'STOLEN' and can cause a sound alert. The sound alert may not be activated if police chose not to alert the criminal stealing away the car.

The iSerp (100) uses a 3 axis MEMS acceleration device and associated logic to detect the accident and sends accident command to Web Server (102). It immediately activates the built in camera in the iSerp (100), and driver's samrtphone iSerp App (120), alert other vehicle registered users, Police App (122) and ER team App (123) with the location of the accident. The police (108) and ER team (109) can dispatch appropriate help at the scene of accident and also know how many passengers are in the affected vehicle. The vehicle driver using iSerp App (120) has option to enlist other passengers in the vehicle and their information. Also police and ER personnel can analyze the video from the driver's smartphone App (120) and iSerp (100) camera. The iSerp server (102) also sends medical details of the driver and passengers to ER team App (123)(109).

In case of tamper of iSerp (100) mounting, iSerp (100) sends plate tamper command to Web Server (102) and loud buzzer is activated at the plate, and Web Server (102) sends plate tamper command text to all the registered users. If no user message is received by the Web Server, the police is informed on their App (122) about a possible theft of the Registration Plate with the location and owner's information. If a vehicle battery is removed, iSerp (100) generates a battery tamper command message to Web Server (102) and Web Server sends command text to all the registered users. If no user responds than Web Server (102) sends a text to police App (122) with vehicle location and suspected theft. Messages are also send to police server (108) and ER server (109).

A special icon is implemented in the iSerp user's smartphone App (120) to touch activate it two times in case of vehicle hijacking. The Web Server (102) immediately sends hijacking messages to all the users, sends command to display "HIJACK" on iSerp plate (100) and police smartphone App (122) with vehicle information to monitor the hijacking and apprehend the hijacker. The police App (122) has a special icon to send a request command to Web Server (102) to send a command to iSerp (100) to initiate shut down of vehicle engine if optional Bluetooth driven hardware (116) installed in the vehicle. The police agency's smartphone App (122) can initiate an 'Amber' alert with the vehicle registration plate number. The Web Server (102) will send 'Amber' display command to vehicle's iSerp (100) to display 'Amber' and sends location of the vehicle in question. Web Server (102) will update police App(122) with the location of the vehicle for police to approach the vehicle. Police App (122) can cancel 'Amber' alert at any time.

The iSerp system and iSerp plate disrupts the present trends in vehicle theft, where thief steals the digital key of the vehicle and clones it to drive away the vehicle. The driver authentication using smarphone App (120) before start and iSerp (100) sending movement and location information to the Web Server (102) would alert the owner's App and police App (122) authority that the vehicle is stolen and driven away for police to catch the thief.

iSerp system with iSerp (100) and Web Server (102) allows automatic toll collection with server map populated with the location of toll booths and border crossing points. The system can easily support eWallet, ePayment and other cashless payment platforms (114).

In commercial vehicles the system communicate with the on board electronics fitted in the vehicle—such as pollution monitoring devices (119), vehicle telematic/passenger count (117). And in case of trucks, it can communicate with the weigh station electronics to check overloading (118). These features are of great help in policing commercial vehicle for compliance and expediting vehicle movement.

iSerp (100) is built with three wireless means for communication—Bluetooth (402), Wi-fi (403) and cellular phone (404). It communicates with the Web Server (102) using Bluetooth (402) pairing with the registered users and using personal Hotspot built in the registered users' smartphone (120). In case it is not able to communicate with this feature with the server then it will use available Wi-fi (105). And the last resort is to use broadband cellular module (404). In the absence of a registered driver user's smartphone App (120), iSerp (100) will search for other registered vehicle users in other vehicle running iSerp App (120) in the crowd, and would use it to communicate with the Web Server (102). In the absence of any registered user in the vehicle or in crowd of vehicles, it will use broadband cellular network (106) to communicate with the Web Server (102).

iSerp system server (102) interacts with the commercial advertising agencies, like Google, Yahoo and others (115) (110) (111), to use its smart plate to display their advertisements using scrolling or full graphic display attached to an iSerp (100).

Figure 3:
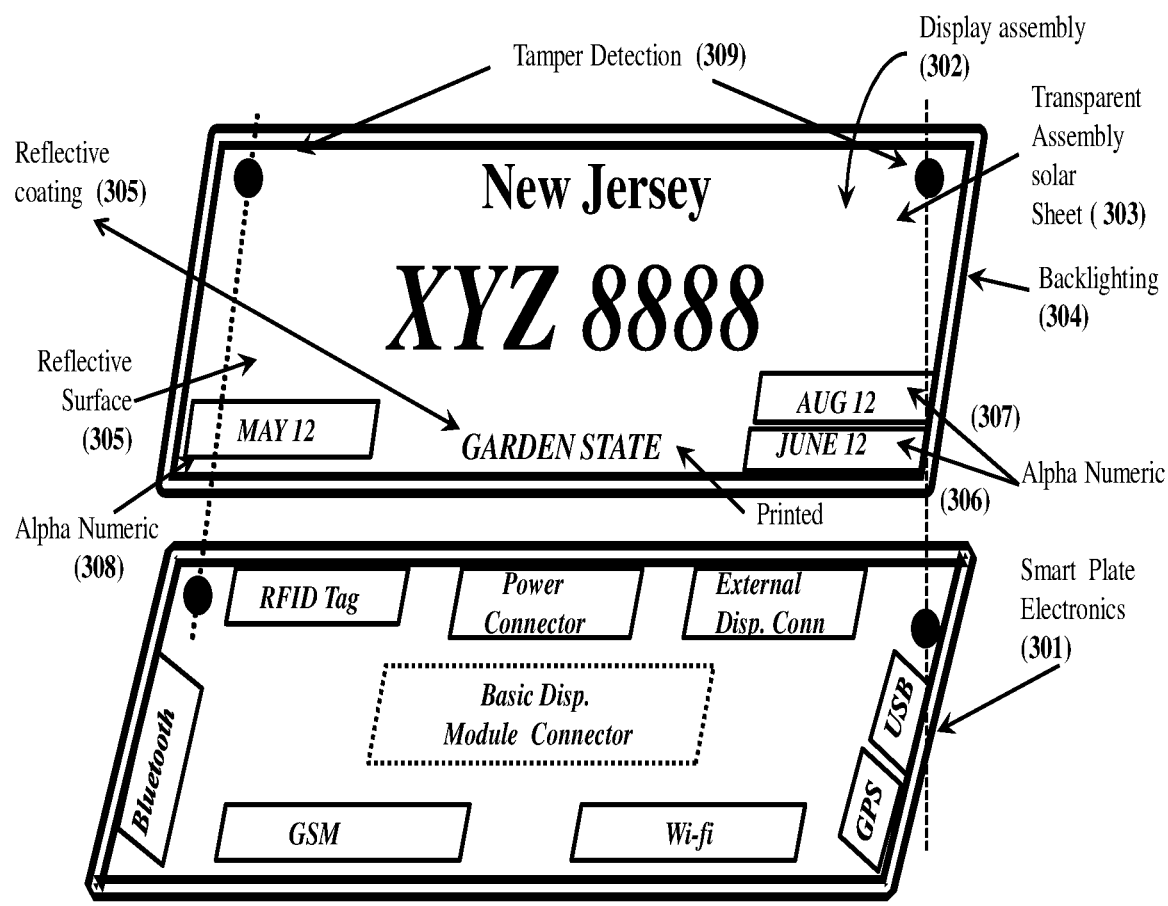

FIG. 3 of invention describes an embodiment of the integrated Smart Electronics Registration Plate. All the electronics is assembled on a single layer printed circuit board (PCB) (301), It gets power from the vehicle through a polarized connector. A plug in polarized external display connector is also mounted on this assembly. The plate mounting holes, two or four, are plated through holes providing electrical connectivity to the mounting screw's head.

The alpha numeric Electrophoretic or E-ink reflective display (302) for vehicle numbers, conforming to the size required by the DMV, are printed in the center of display PCB. The registration expiry data (306) and inspection date (307) alpha-numeric display are printed on the bottom right. Insurance expiry date display (308) is on the bottom left. All the interconnecting pads of displays are brought to the inner layer of the plate display PCB to a flexible connector which connects to the display driver of the electronics PCB (301). Size of these additional display characters would be decided by the DMV agency. Plated through mounting holes (309), and tamper detecting pads are also on this module. The display module (302) can be coated with a reflective color coat as required by a state agency with the state logo as desired. Top of this panel has a transparent solar sheet (303) which charges the backup battery when vehicle engine is not running. The backlighting assembly (304) is also on this panel.

These two assemblies (301), (302) are than sandwiched with a frame which looks like standard Registration Plate offered by the DMV. It is also possible to assemble the display and plate electronics (301) and (302) on a single four-layered PCB with transparent solar panel mounted separately on the top.

It is also possible to keep display PCB and transparent solar panel (302) as one assembly and separately all electronics (301) in one small module connected to this assembly. The module (301) can be system on chip (SOC) custom design for the plate electronics. It is also possible to integrate this iSerp assembly on the plastic bumper assembly of a vehicle. The smart electronics can be integrated in the vehicle telematic or in a standalone unit to offer all the features of the system with or without govt. agencies.

Figure 4:
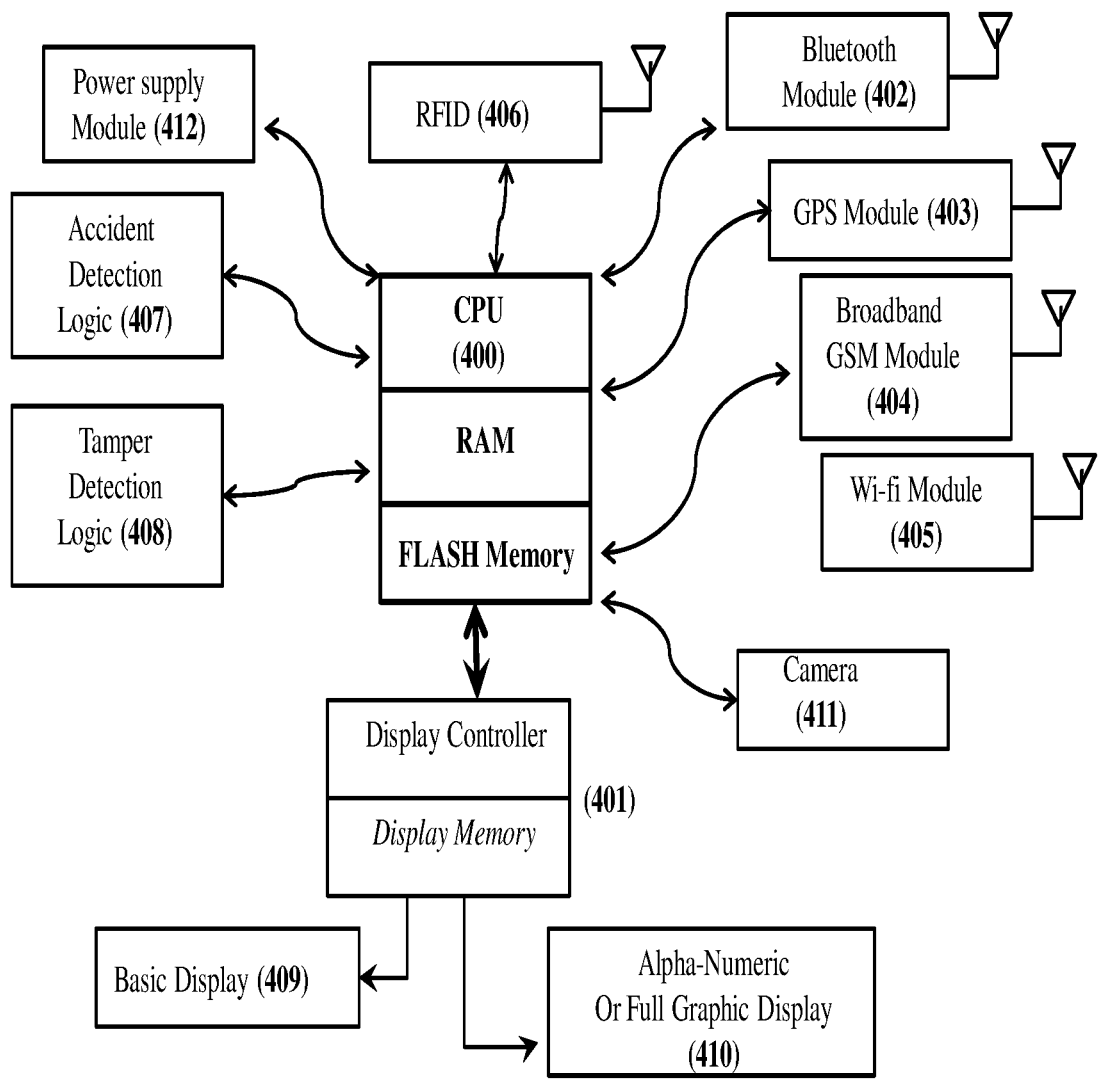

FIG. 4 gives the block diagram of the iSerp plate electronics. The heart of the plate is a Cortex AS processor from ARM or any other processor (400) with RAM and FLASH Memory with low power consumption. E-ink display controller with driver is used to control displays (409) (410). Bluetooth (402), broadband cellular modem (404), Wi-fi module (405) and rfid Tag (406) is connected to the processor through a communication bus like I²C. Camera (411) module uses a SPI interface Bus.

Accident detection logic (407) uses a 3D accelerometer MEMS device to detect acceleration in X, Y, Z axes. The vehicle acceleration is different at the time vehicle stationary, during movement and during an impact of a crash or accident. The microprocessor (400) uses its firmware to make this decision. This art is well known and every modern vehicle airbag system uses this technology. The microprocessor (400) detects vehicle movement and sends a message to Web Server (102). It also sends accident message to Web Server (102) in case of a crash impact. The Web Server (102) can stream video from the iSerp (100) camera (411) as well as from the camera of driving user's smartphone App (120), to the police agency App (122) and ER personnel App (123).

Figure 5:
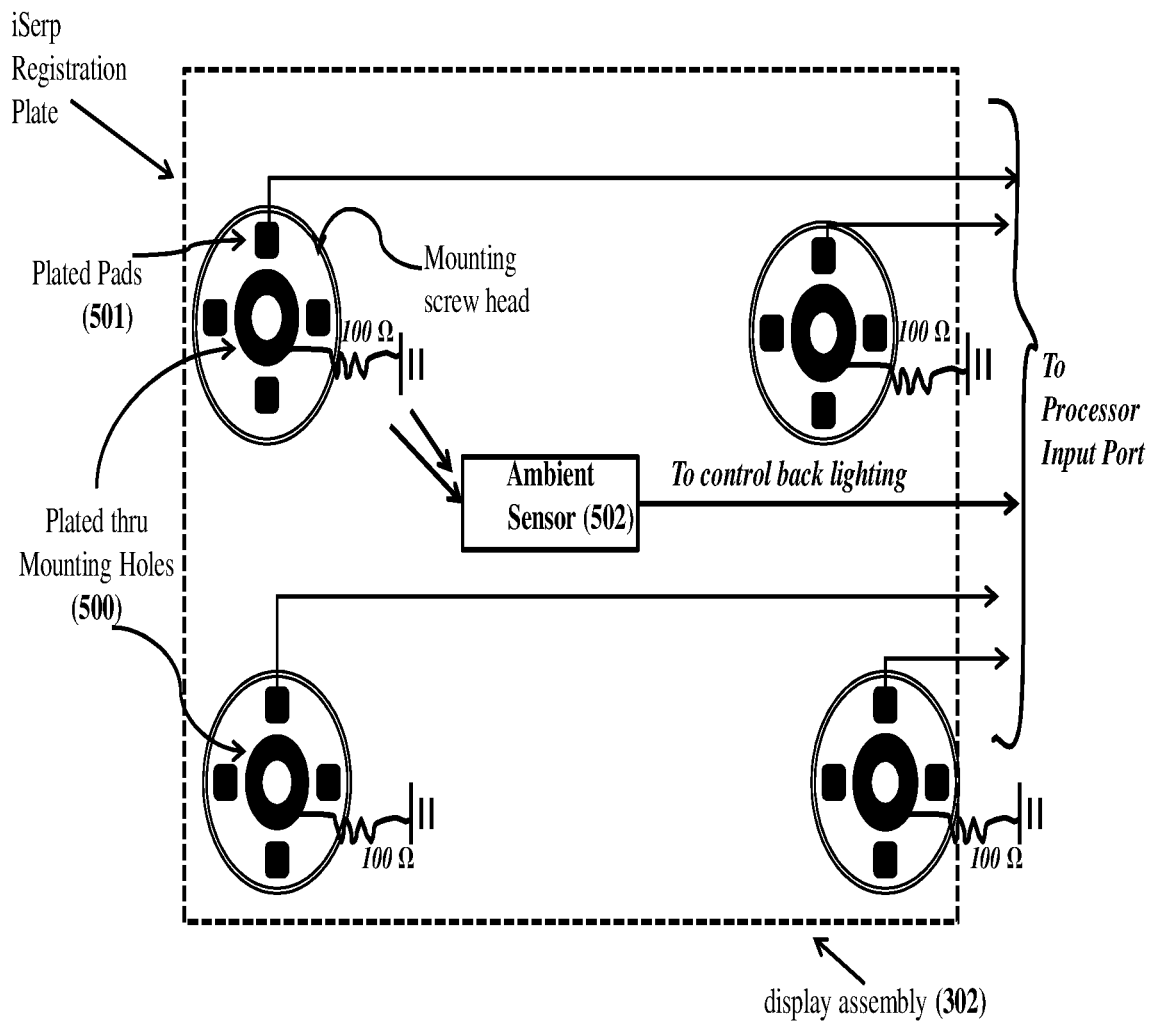

FIG. 5 gives exploded iSerp (100) tamper detection logic (408). The plated through mounting holes (500) have four plated through pads (501) in a circle 90 degrees apart. Each of these pads are connected to the input of the processor (400). The mounting holes (500) is connected to the ground with 100 ohm resistor. These four Pads (501) on the plate gets connected to the ground with mounting screw's head when plate is mounted on the vehicle. Any attempt to move these screws will break the ground path to the processor input and processor (400) activates an audible alarm as well tamper message from iSerp (100) to Web Server (102). And the Web Server would send a tamper alert to the vehicle registration users smartphone App (120). Invention shows four Pads (501). Adding more pads further increases tamper resistance. The ambient sensor (502) mounted on the plate allows processor to turn on the backlighting of the display at night while driving the vehicle to further increase visibility of Registration Plate (100) at night, although not necessary with E-ink display.

Registration Plate (100) in the invention is connected with the vehicle battery power and ground using vehicle power connector at the vehicle standard Registration Plate. The iSerp power module (412) uses this to power the Registration Plate most of the time as display module (302) does not need power to maintain the display. It uses battery power sensing, a well known method used to power the laptops and smartphones, to detect if the battery cable is cut to alert the Web Server (102). The server (102) alerts the vehicle registered users on the smartphones running iSerp App. Web Server (102) waits to get response from users to take further action. The backup battery is used on this scenario only. Backup battery is charged by the vehicle battery or the transparent solar panel (303) mounted on the plate.

rfid (406) adds to additional method to read vehicle registration information if needed by DMV agency (107).

Figure 6:
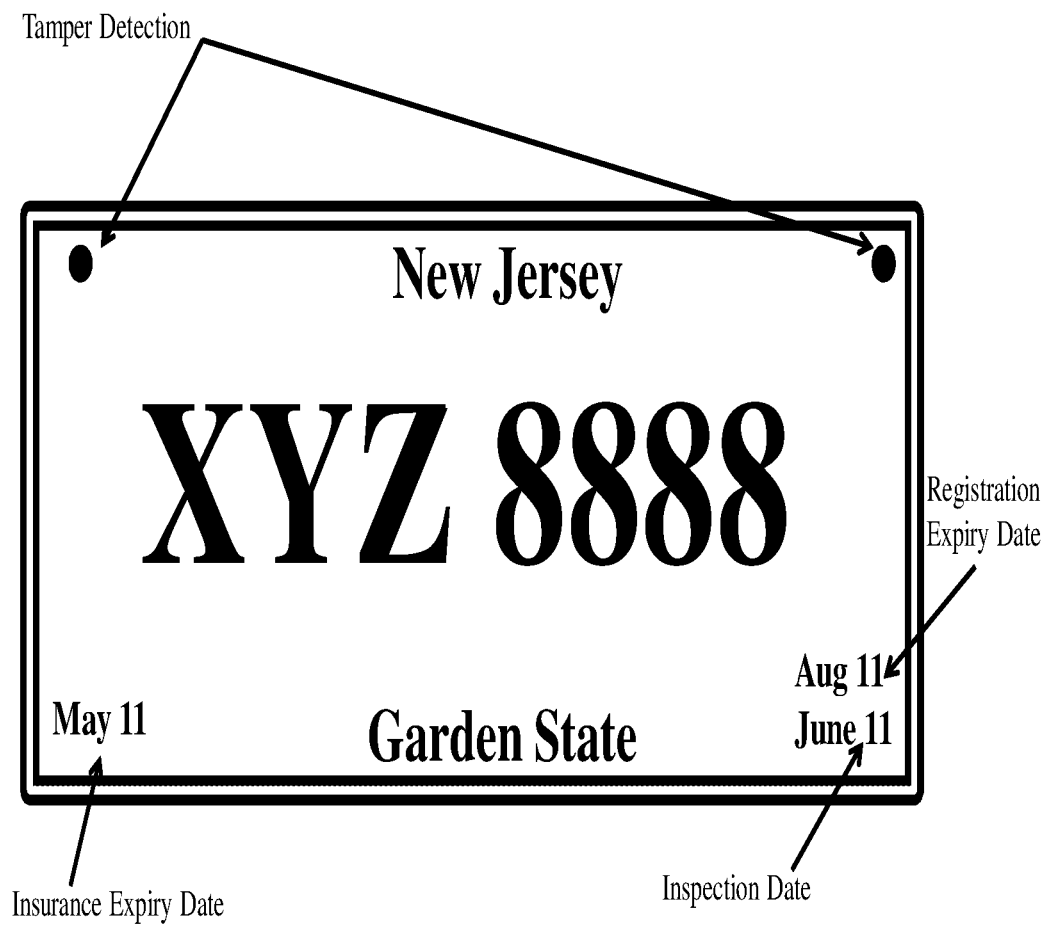

This invention envisions five versions of the integrated Smart Electronics Registration Plate. A basic Smart Electronics Registration Plate is shown in FIG. 6. It has electronics with E-ink Alpha-Numeric display to substitute the standard plate found today in 2, 3, 4 or more wheels vehicles. Added display of registration expiry date, inspection expiry date, and insurance expiry date will help the DMV and police agencies to maintain compliance by the owners. And it still maintains the look of standard plate with smart system features described earlier.

Figure 7:
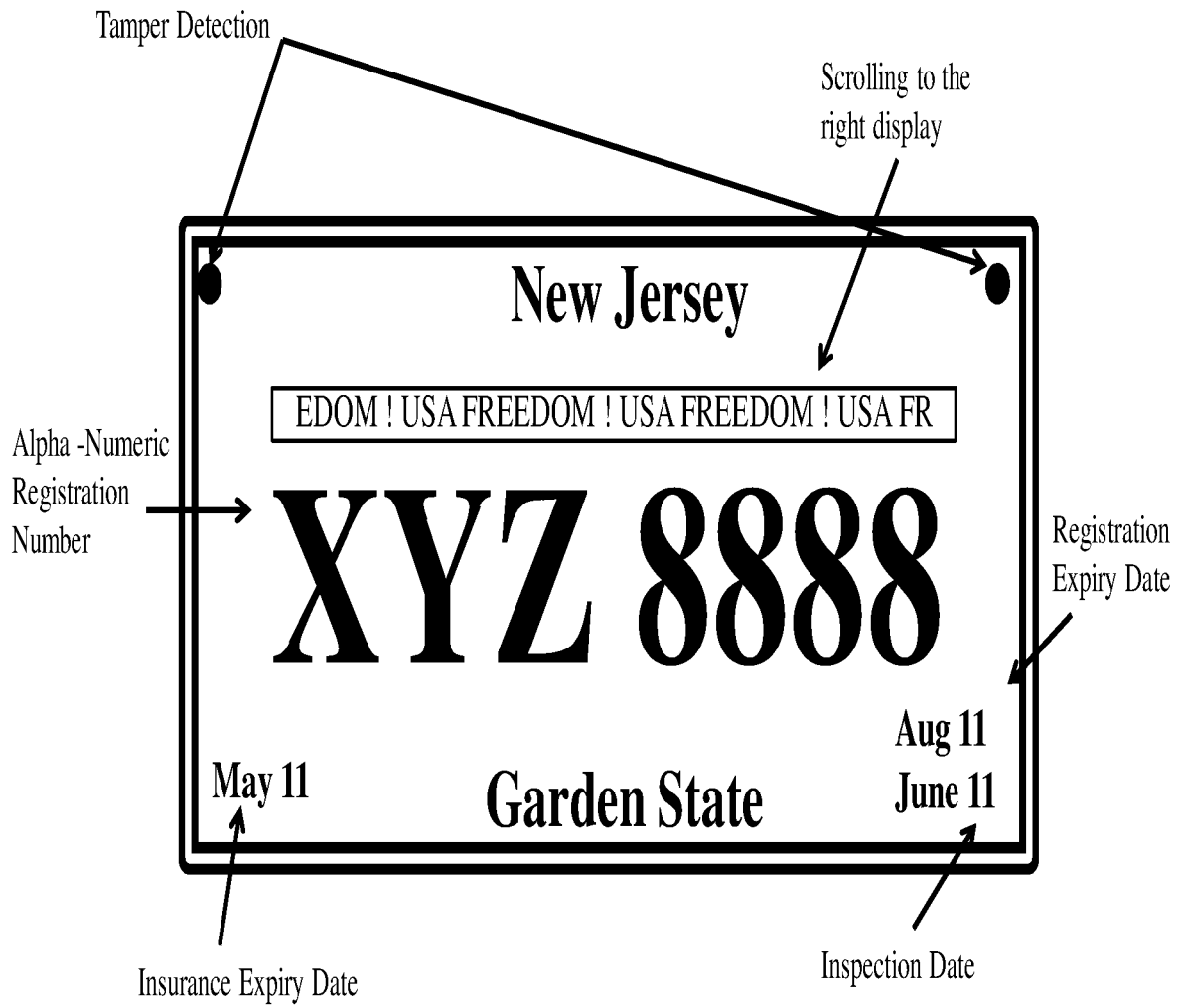
Figure 8:
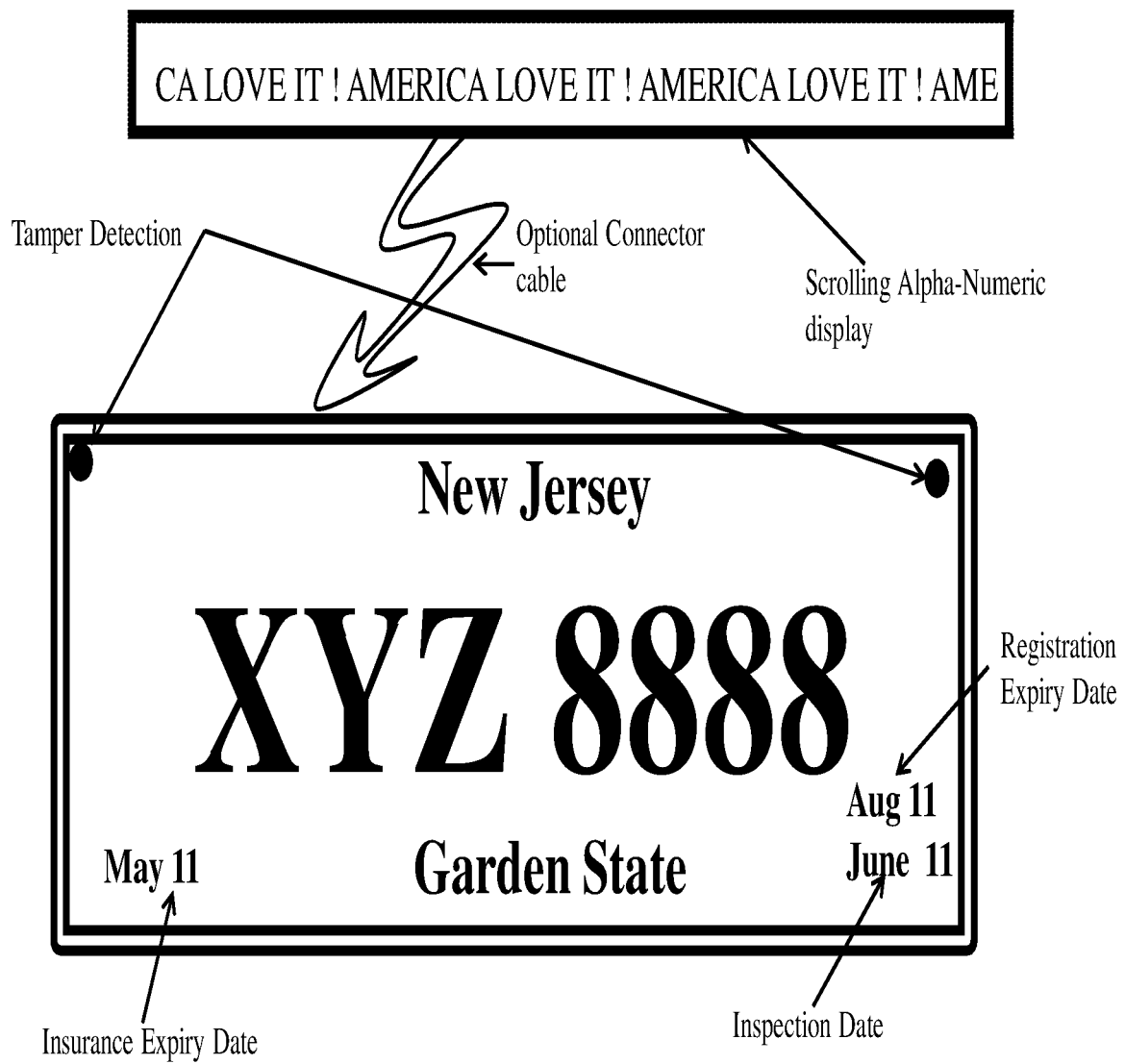
FIG. 8 Basic Registration Plate with scrolling Alpha-Numeric display (External)
FIG. 9 Basic Registration Plate with full external graphic display
FIG. 10 Registration Plate with full graphic display and full external graphic display.
Figure 9:
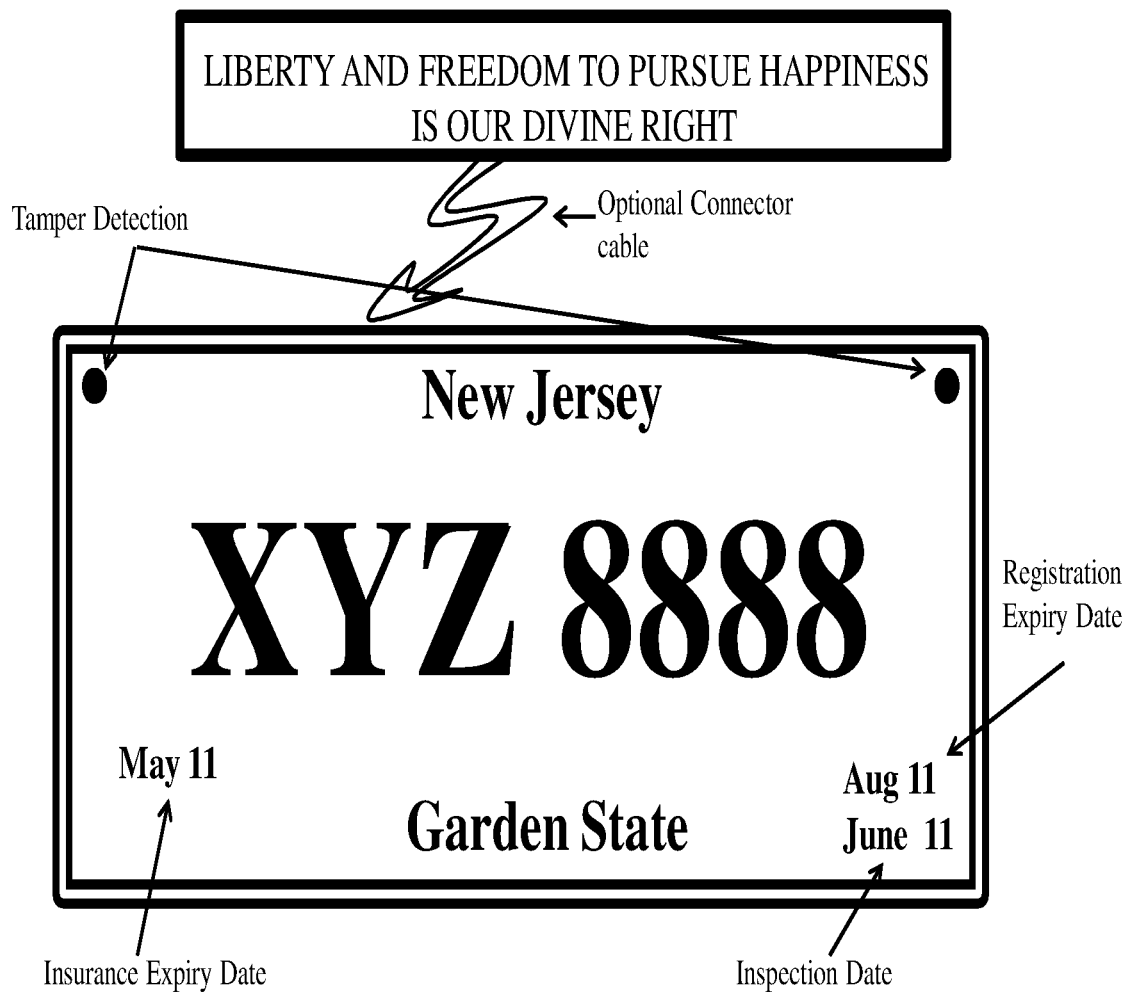
Figure 10:
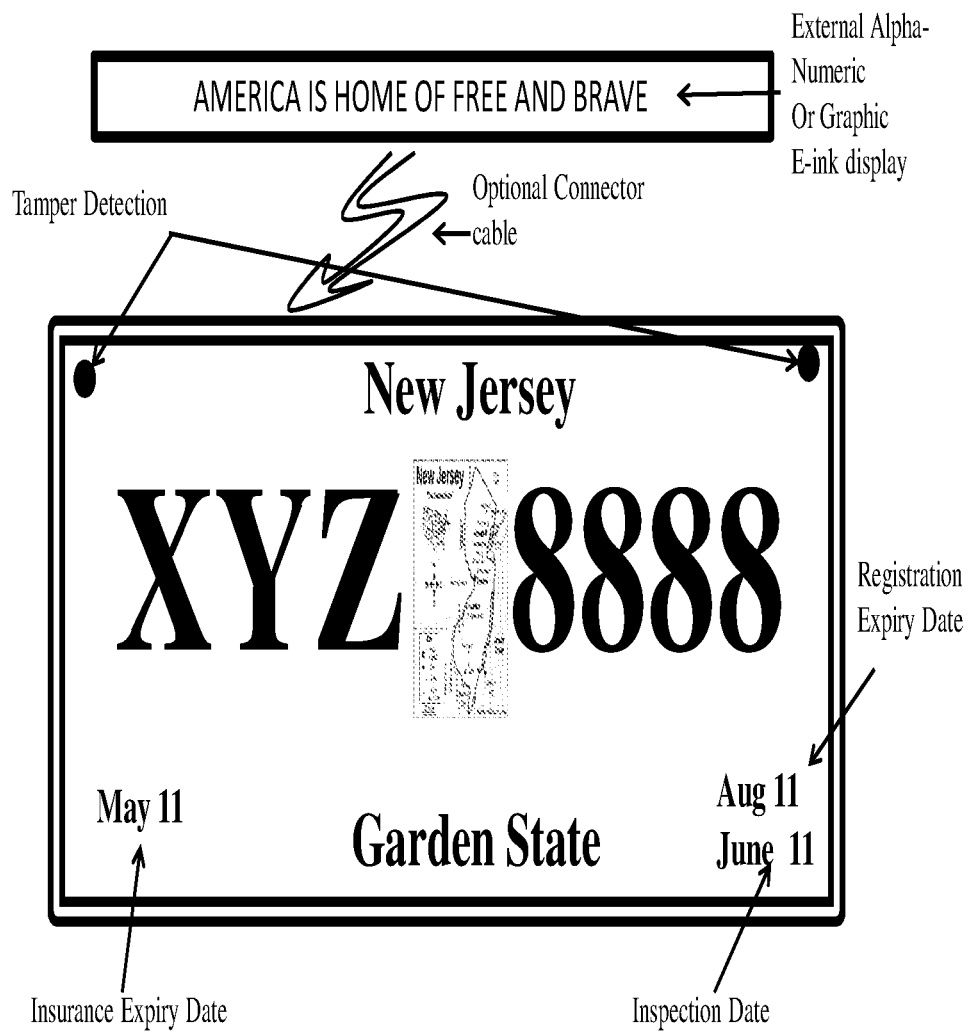

The second design is shown in FIG. 7. Its basic registration plate described in the FIG. 6 with a scrolling alpha-numeric display added on the plate display. This design allows scrolling messages to be displayed on the plate by Web Server (102). The third design of the plate is shown in FIG. 8. It is a basic registration plate of FIG. 6 with an external scrolling alpha-numeric display. The fourth design of the plate is described in FIG. 9. It is the basic plate of FIG. 6 with an external full graphic display. This allows Web Server (102) to display full moving graphic messages on the plate. The final, fifth version is shown in FIG. 10. In this design the Registration Plate is fully graphic and it can underlay messages while displaying steady registration plate information. This version also supports an external graphic or scrolling display.

What is claimed is:

1. A web server based system with an integrated smart electronics registration plate mounted on motor vehicle:
    wherein the web server is configured to communicate
        wirelessly with a plurality of remote servers including federal investigation agency server, state Department of Public Safety server, Department of Motor Vehicles server, law enforcement server, and emergency medical care server;

wherein the web server is configured to communicate with the integrated smart electronics registration plate to detect tampering of the integrated smart electronics registration plate, detects vehicle theft, vehicle hijacking, vehicle accident, amber alerts processing, cash less toll collection, passenger monitoring, and vehicle pollution monitoring;

wherein the web server is configured to communicate wirelessly with the integrated smart electronics registration plate to transmit and receive an alert message, wherein the alert message comprising of vehicle location, vehicle accidents and location, vehicle plate tamper status with location, vehicle battery tamper detection status with location, and picture or video streams of vehicle accident scenes, wherein the integrated smart electronics registration plate through the web server is configured to communicate wirelessly with a telematics system on board of the vehicle and road electronics;

wherein the web server is configured to perform management of the integrated smart electronics registration plate including transmitting text alert message; secure communication key management, at least triple authentication for vehicle users to log in;

wherein the web server is configured to be accessible with a communication device providing interface to establish communication with Department of Motor Vehicles (DMV) person, law enforcement agency person, and emergency medical care services person;

wherein the web server forms a communication channel to receive information from a vehicle user or the remote servers and transmits the received information to the integrated smart electronics registration plate; the integrated smart electronics registration plate transmits information to the web server and the web server transmits information received from the integrated smart electronics registration plate to the vehicle user or the remote servers thus restricting direct access to the integrated smart electronics registration plate from the vehicle user;

wherein the web server communicates with a Global Positioning System (GPS) location and mapping application to transmit a location of the motor vehicle to the remote servers or the vehicle user;

wherein the web server is configured to communicate with a database server to store and retrieve data; wherein the database server stores data including vehicle identification number (VIN) of the motor vehicle, color of the motor vehicle, model of the motor vehicle, motor vehicle owner and authorized user name and addresses, driver license numbers and expiry dates, integrated smart electronics registration plate number, date registered, state, country, and location of toll booths;

wherein the integrated smart electronics registration plate comprises of a 3 axis microelectromechanical system (MEMS) acceleration device under the control of microcomputer to activate an accident detection logic capable of detecting an accident and a transmitter to transmit an alert that indicates of the accident to the web server; and wherein the MEMS acceleration device activates a camera unit to capture photos and videos in response to the accident, and transmits the captured photos and videos to the web server.

2. The integrated web server based system with an integrated smart electronics registration plate according to claim 1, wherein the integrated smart electronics registration plate comprises of a housing adapted for mounting to a vehicle body conforming with a physical size appearance, and thickness of a standard registration plate.

3. The integrated web server based system with an integrated smart electronics registration plate of claim 2, wherein the microcomputer is electronically coupled with a processing circuitry controlled by the web server are disposed within said housing.

4. The web server based system with an integrated smart electronics registration plate according to claim 1, wherein the integrated smart electronics registration plate comprises of a display unit consists of a display driver to control display.

5. The web server based system with an integrated smart electronics registration plate according to claim 1, wherein the integrated smart electronics registration plate comprises of a monolithic display unit which utilize electrophoretic ink based alpha numeric or full graphic characters to display vehicle registration plate number, registration validity, inspection validity, insurance validity; further in said display unit displays rolling alpha numeric display; a fully graphic display externally to the integrated smart electronics registration plate.

6. The web server based system with an integrated smart electronics registration plate according to claim 1, wherein a GPS unit transmits GPS coordinate of the integrated smart electronics registration plate to the web server; further in the web server communicates said GPS coordinates to the one or more remote servers and the vehicle user.

7. The web server based system with an integrated smart electronics registration plate according to claim 1, is accessible by a user application using the communication device, wherein the communication device is a smart phone.

8. The web server based system with an integrated smart electronics registration plate according to claim 7, wherein the web server transmits said photos and videos to the smart phone.

9. The web server based system with an integrated smart electronics registration plate according to claim 1, wherein the integrated smart electronics registration plate comprises of a wireless means for communication with the web server, wherein the wireless means for communication includes Bluetooth, Wi-Fi® and/or cellular communications.

10. The web server based system with an integrated smart electronics registration plate system according to claim 9, wherein the wireless means for communication enables the integrated smart electronics registration plate to send and receive data from the web server.

11. The web server based system with an integrated smart electronics registration plate according to claim 1, wherein the integrated smart electronics registration plate comprises of a tamper detecting pads capable of sending plate tamper alert command to the web server on activation of a tamper detection logic.

12. The web server based system with an integrated smart electronics registration plate according to claim 11, wherein the tamper detection pads on enabling tamper detection logic, transmits GPS location to the web server and sends a command to a display unit thus displaying "Tamper" text; further in the web server communicates the GPS location and initiates a pre-defined message to the one or more remote servers and the vehicle user.

13. The web server based system with an integrated smart electronics registration plate according to claim 11, wherein the tamper detection pads on enabling tamper detection logic initiates a sound alert.

14. The web server based system with an integrated smart electronics registration plate according to claim 11, wherein the tamper detection pads detect a removal of battery from the motor vehicle thus generating a battery tamper alert command sent to the web server; further in the web server communicates the GPS location and initiates a pre-defined message to the one or more remote servers and the vehicle user.

15. The web server based system with an integrated smart electronics registration plate according to claim 1, wherein the integrated smart electronics registration plate comprises of a power module connected with a motor vehicle battery supplies power to said microcomputer enabling the operations and controls of said smart electronics registration plate.

16. The web server based system with an integrated smart electronics registration plate according to claim 15, wherein said power module further comprises of a backup battery powered by a transparent solar sheet mounted on the integrated smart electronics registration plate; further in the backup battery utilizes a transparent sheet coated with organic molecules to convert ultraviolent and near infrared wavelengths energy into electricity to charge the backup battery in the absence of the motor vehicle battery.

17. The web server based system with an integrated smart electronics registration plate according to claim 16, wherein the power module utilizes the motor vehicle battery to charge the backup battery.

* * * * *